United States Patent
Tomatis

(10) Patent No.: US 8,968,053 B2
(45) Date of Patent: Mar. 3, 2015

(54) METHOD FOR THE TREATMENT OF STEEL SURFACES, PARTICULARLY OF CHEESEMAKING MACHINES

(75) Inventor: Stefano Tomatis, Peveragno (IT)

(73) Assignee: C.M.T. Costruzioni Meccaniche e Tecnologia S.p.A., Peveragno (IT)

( * ) Notice: Subject to any disclaimer, the term of this patent is extended or adjusted under 35 U.S.C. 154(b) by 571 days.

(21) Appl. No.: 13/261,104

(22) PCT Filed: Sep. 20, 2010

(86) PCT No.: PCT/EP2010/005768
§ 371 (c)(1),
(2), (4) Date: Dec. 23, 2011

(87) PCT Pub. No.: WO2011/047762
PCT Pub. Date: Apr. 28, 2011

(65) Prior Publication Data
US 2012/0097049 A1    Apr. 26, 2012

(30) Foreign Application Priority Data

Oct. 23, 2009  (IT) .................................. TO09A0806

(51) Int. Cl.
*B24C 1/00* (2006.01)
*B24C 11/00* (2006.01)
*A01J 25/00* (2006.01)
*B24C 1/06* (2006.01)

(52) U.S. Cl.
CPC ............... *B24C 11/00* (2013.01); *A01J 25/008* (2013.01); *B24C 1/06* (2013.01)
USPC .............................................. 451/36; 51/309

(58) Field of Classification Search
CPC ............ B24B 1/00; B24B 11/00; B24C 1/06; B24C 11/00; A01J 25/008
USPC .................................... 451/36, 38, 39; 51/309
See application file for complete search history.

(56) References Cited

U.S. PATENT DOCUMENTS

| | | | | |
|---|---|---|---|---|
| 2,695,478 A * | 11/1954 | Comstock et al. | ............... | 451/28 |
| 4,091,721 A * | 5/1978 | Cosmi | .............. | 99/453 |
| 4,258,505 A * | 3/1981 | Scheiber et al. | ................ | 451/36 |
| 4,289,541 A * | 9/1981 | Wallner et al. | .................... | 134/7 |
| 4,898,745 A * | 2/1990 | Zamzow et al. | .............. | 426/582 |
| 5,827,573 A * | 10/1998 | Tsai | .............................. | 427/327 |
| 5,829,344 A * | 11/1998 | Lande | ............................. | 99/453 |
| 8,206,201 B2 * | 6/2012 | Fioratti | ........................ | 451/526 |
| 2005/0107017 A1* | 5/2005 | Fioratti | ........................ | 451/526 |
| 2010/0015369 A1* | 1/2010 | Schroder et al. | ............. | 428/34.1 |

FOREIGN PATENT DOCUMENTS

| | | | |
|---|---|---|---|
| CN | 102615587 A | * | 8/2012 |
| GB | 1 150 433 A | | 4/1969 |
| JP | 4 083886 A | | 3/1992 |
| RU | 2455368 C1 | * | 7/2012 |

OTHER PUBLICATIONS

Mineral News, General Corundum Information, found on internet Jul. 7, 2014.*
CB Sabbiatrici White Corundum found on the interent Jul. 7, 2014.*

* cited by examiner

*Primary Examiner* — Maurina Rachuba
(74) *Attorney, Agent, or Firm* — Modiano & Associati; Albert Josif; Daniel J. O'Byrne

(57) ABSTRACT

In order to avoid using anti-stick paints, based on polytetrafluoroethylene or the like, on parts of cheesemaking machines which are to be in contact with hot curds (pastafilata), their surfaces are sandblasted with preferably virgin white corundum powder having a granulometry of about 180 mesh. Surprisingly, surfaces so treated are non-stick for the purposes mentioned above.

6 Claims, No Drawings

METHOD FOR THE TREATMENT OF STEEL SURFACES, PARTICULARLY OF CHEESEMAKING MACHINES

This invention is concerned with a method for treating steel surfaces to make them non-stick to hot curds and caseins, particularly in cheesemaking machines for the production of pastafilata cheese, such as mozzarella, provolone, caciocavallo and pizza-cheese.

BACKGROUND OF THE INVENTION

It is well known in the dairy industry that hot milk curds, such as used in the production of pastafilata cheese, tend to stick to metal surfaces, even if highly polished. On the one hand, this sticking gives rise to obvious problems in the operation of cheesemaking equipment such as kneading and molding machines, particularly with respect to conveying augers and molds; on the other hand, the adhering curds make it difficult and time-consuming to clean the machine at the end of the day. Consequently, all parts of machines and production lines for pastafilata cheese which are to contact the hot cheese (such as walls of hoppers and vats, conveying augers, mixing equipment, etc.) are currently coated with an anti-stick paint, which as a rule is polytetrafluoroethylene (PTFE, such as the material commercially known as Teflon) or other similar product. Until now, the polytetrafluoroethylene coating has been the only known and effective approach to prevent the sticky adhesion of hot curds to machine parts. Moreover, a coating of PTFE or other similar compound is also used, outside the dairy industry, as an anti-stick treatment in pots and saucepans.

However, non-stick coatings in food equipment, particularly cheesemaking machines, have several drawbacks and limitations. Firstly, the coat will progressively deteriorate, sometimes quite rapidly, whenever the deterioration is triggered by an initial damage, such as scoring of the coat, as this will give rise to material peeling. In such cases, which involve the shutdown of the operation, the machine has to be disassembled and the parts have to be re-coated. The expense for such periodic maintenance, including actual disbursements and machine shutdown, is considerable, because the parts must be dismantled and re-coated by a third party, with waiting times of up to 30 days.

Even for original manufacturers of food industry equipment, the necessity to coat the equipment with Teflon involves additional costs and manufacturing delays, because, as a rule, the non-stick coating operation is outsourced to specialized firms.

Last but not least, PTFE, although chemically inert and generally regarded as non-toxic at temperatures below 200° Celsius, and therefore considered harmless for the health of the consumers, has recently given rise to doubts concerning its toxicity and its compatibility with food, and suspicions have even been put forward that it may be carcinogenic: both the U.S. Environmental Protection Agency and several consumer associations in different countries are conducting investigations to assess the degree of toxicity of PTFE and its possible danger to human health.

SUMMARY OF THE INVENTION

It is therefore a main object of this invention to provide a method for treating steel surfaces so that they are non-sticky, without using polytetrafluoroethylene, particularly in cheesemaking machines handling hot curds, more particularly on augers and molds belonging to such machines.

Another object is to provide a method of surface treatment as above, which can be easily implemented by using technologies that are readily available and adoptable by manufacturers of cheesemaking equipment.

Still another object is to provide a method of surface treatment as above, by which the production times in equipment manufacture can be shortened.

A further object is to provide a method of surface treatment by which the steel surfaces in cheesemaking machines can be more readily and accurately sanitized.

The invention achieves the above and other objects and advantages, such as will appear from the following disclosure, by a method of anti-stick treatment for steel surfaces, particularly in cheesemaking machines, as recited in the attached claim 1.

The invention also concerns machine parts, such as augers, ducts and the like, which have been treated by the above method.

DESCRIPTION OF THE PREFERRED EMBODIMENTS

In developing the invention, the inventor set out from the observation that the degree of stickiness of hot curds on steel surfaces free from coatings appeared to be quite high both on highly polished surfaces and on roughly sandblasted surfaces, but there were considerable, apparently unforeseeable variations with intermediate degrees of finish. This circumstance gave rise to an initial intuition that there might be a kind of surface finish which would be inherently non-sticky to hot curds or pastafilata, without a need for any coating of PTFE or other anti-adhesive material. In order to single out a particular finish that would be non-sticky to hot curds, and could therefore be adopted in cheesemaking machines instead of a PTFE coating, the inventor has conducted a set of tests on stainless steel surfaces which had been treated with different surface finishes, in the typical operating conditions prevailing in cheesemaking machines for the production of pasta-filata cheese (mozzarella and the like), i.e. mainly in kneading and molding machines.

A set of preliminary tests conducted on stainless steel AISI 304 and AISI 316 (i.e. the steels that are typically used in the construction of cheesemaking machines and more generally food machines) have shown that a number of finishes was to be set aside. More particularly, peening the steel surfaces with either steel shot or glass beads (such as are commonly used in the dairy industry to shot-peen augers, vats and other parts of machines) in the ranges 55-100 microns (extra fine peening), 70-110 micron (fine peening), 90-150 micron (medium peening), 100-200 micron (rough peening), all turned out to be ineffective: stickiness is heavy with any kind of peening and any value of granulometry.

Hot curds showed a considerable degree of adhesion also to surfaces that had been subjected to electrolitic polishing, oxidation, or sandblasting with siliceous sands.

Finally, systematic tests were conducted with surfaces that had been sandblasted with corundum powder, more particularly white corundum. For this purpose, specimens were prepared consisting of small rectangular plates made of AISI 304 stainless steel. The plates were obtained from commercial steel sheet of 3 mm thickness, size 300×70 mm, and with a surface having a standard finish 2B (AISI, UNI 6903-71). The specimens were treated with different surface sandblasting treatments, as explained below.

White corundum is the commercial name of a material essentially consisting of aluminum oxide ($Al_2O_3$) with minute traces of other oxides such as silicon oxide, calcium oxide and sodium oxide, at an overall percentage lower than 0.5%. As well known, white corundum has a Mohs hardness 9, only surpassed by the hardness of diamond.

The various specimens were sandblasted with powder at different granulometries, i.e. 80, 100, 120, 150, 180, 220 and 280 mesh, respectively, which correspond to gauges of the grains of material in the ranges 0.18-0.20 mm, 0.13-0.15 mm, 0.11-0.13 mm, 0.08-0.11 mm, 0.06-0.09 mm, 0.05-0.08 mm, and 0.03-0.06 mm, respectively.

The specimens were sandblasted by projecting air and corundum powder at an air pressure of about 8 bar, from a distance of about 50 cm, under a slow orbiting motion of the projection nozzle, while gradually shifting the spray along the surface so that the speed of the treatment was about 100 cm²/min.

For each test, a quantity of curds was mixed with water at a temperature of 80° in a cauldron, thereby re-creating the conditions prevailing while pastafilata cheese is kneaded during its production.

As known to experts in the field, pastafilata is less sticky when unripe, and becomes more and more sticky as it ripens, i.e. as its acidity increases due to progressive breaking up of lactose. Accordingly, curds were selected that had been obtained by fermentation from lactic ferments at pH=5.1-5.2; this is a typical value for the curds when they are kneaded for producing pastafilata cheese.

In conducting the tests, two differently sanded specimens were immersed in the above mentioned bowl and were moved around to stir the pastafilata. The specimens were pressed and brushed against each other, the pastafilata being laminated therebetween. Both specimens were then lifted aut of the water and slowly taken apart. The surfaces of the specimens were then examined in order to determine the degree of adhesion of the pastafilata in both cases and to do a comparison. The specimen that had turned out to be more sticky was discarded and replaced with a specimen of a different finish, thereby forming a fresh pair of specimens for executing a new test, and so on.

After sandblasting, the specimens were subjected to adherence tests according to the above described procedure, i.e. by lifting a lump of pastafilata from the water and squeezing and rubbing it between two specimens, and then separating the specimens and examining their surfaces and the behavior of the pastafilata. The results of the tests are listed in the table below.

| Sandblasting 1st specimen | Sandblasting 2nd specimen | Performance at separation |
|---|---|---|
| 80 mesh | 120 mesh | pastafilata fragments and adheres on both specimens |
| 100 mesh | 120 mesh | idem |
| 80 mesh | 150 mesh | pastafilata adheres to both specimens but mainly on 1st one |
| 100 mesh | 150 mesh | idem |
| 120 mesh | 150 mesh | idem |
| 100 mesh | 180 mesh | pastafilata fully adheres to 1st specimen - 2nd specimen clean |
| 120 mesh | 180 mesh | pastafilata fully adheres to 1st specimen - 2nd specimen clean |
| 150 mesh | 180 mesh | pastafilata fully adheres to 1st specimen - 2nd specimen clean |
| 120 mesh | 220 mesh | pastafilata adheres to both specimens, but mainly on 1st one |
| 150 mesh | 220 mesh | pastafilata fragments and adheres equally on both specimens |
| 180 mesh | 220 mesh | pastafilata fully adheres to 2nd specimen - 1st specimen clean |
| 120 mesh | 280 mesh | pastafilata sticks to both specimens, but mainly on 1st specimen |
| 150 mesh | 280 mesh | pastafilata adheres on both specimens in equal degree |
| 180 mesh | 280 mesh | pastafilata fully adheres to 2nd specimen - 1st specimen clean |
| 220 mesh | 280 mesh | pastafilata sticks to both specimens, but mainly on 2nd specimen |

The test results listed in the table above lead to the surprising conclusion that pastafilata does not adhere to steel plate that has been sandblasted with white corundum sand at 180 mesh.

Further tests showed that, although the optimal value of the granulometry of the sand used for sandblasting is 180-mesh, acceptable results were obtained generally with granulometries in the range 170 to 190 mesh.

The same tests were repeated with curds obtained by coagulation caused by citric acid, pH=5.8- 5.9, which is a kind of curds frequently employed in the production of pastafilata cheese such as mozzarella and the like. The results were substantially identical with the ones listed in the table above.

The same tests were repeated with air pressures different from 8 bar as mentioned above, with results leading to the conclusion that the effectiveness of the sandblasting treatment with respect to non-adherence changes little with the changes of the air pressure, in the range of values commonly adopted (5 to 10 bar). The preferred values are 7 to 9 bar, a pressure of 8 bar being optimal.

It was observed that, although sandblasting with corundum is typically applied to machine parts made from polished steel sheet, the effectiveness of sandblasting according to the invention has turned out to be independent of the initial finish of the surface.

It should be noted that the essential reason for using synthetic white corundum rather than natural corundum is that white corundum is free from ferric oxide, which, as well known, with its presence would contaminate the stainless steel being sandblasted, starting oxidation and consequent erosion. However, the anti-adherence effect appears to be inherent to corundum generally.

Moreover, it was observed that, as the corundum sand is repeatedly used in subsequent sandblasting operations, its effectiveness to provide anti-adhesion to the treated surface is gradually reduced. It is believed that this is essentially due to the fact that the corundum grains tend to break with mutual impacts, thereby progressively changing the effective granulometry of the sand. Accordingly, it is preferable to only use virgin corundum sand, or sand that has been used at most twice.

As an alternative, the corundum sand may be preferably sifted after each pass, in order to obtain a sand that is rigorously classified at the desired granulometry.

The invention was developed with particular reference to the dairy industry and to the manufacture of augers, ducts and molds in cheesemaking equipment, but it is envisaged that it can also be applied to the treatment of the internal surfaces of skillets and frying pans, by sandblasting with white corundum as disclosed above and dispensing with the currently used coating of PTFE-based non-stick paints. Frying pans or pots so treated will exhibit at least partial non-stick properties not only toward casein but also toward albumin and other animal proteins, and will therefore be particularly effective in preventing sticking when frying eggs or bacon or similar foodstuffs.

What is claimed is:

1. A method for the non stick treatment of steel surfaces Of cheesemaking machines, consisting in sandblasting the steel surfaces by projecting a Stream of air mixed with white corundum sand having a granulometry in the range 170 to 190 mesh.

2. The method of claim 1, wherein the granulometry of the sand of white corundum is 180 mesh.

3. The method of claim 2, wherein the stream of air mixed with white corundum sand is blown at a pressure of 8 bar.

4. The method of claim 3, wherein the stream of air mixed with white corundum sand is blown from a distance of about 50 cm from the surface being treated.

5. The method of claim 1, wherein the sand of white corundum is virgin.

6. The method of claim 1, wherein the sand of white corundum is classified to a predetermined granulometry before sandblasting.

* * * * *